United States Patent
Übler et al.

(10) Patent No.: US 9,972,857 B2
(45) Date of Patent: May 15, 2018

(54) METHOD FOR STORING AND TRANSPORTING ELECTROCHEMICAL ENERGY

(75) Inventors: Christoph Übler, Lautersheim (DE); Dietmar Bender, Boehl-Iggelheim (DE); Moritz Ehrenstein, Ludwigshafen (DE); Andreas Fischer, Heppenheim (DE); Günther Huber, Ludwigshafen (DE)

(73) Assignee: BASF SE, Ludwigshafen am Rhein (DE)

( * ) Notice: Subject to any disclaimer, the term of this patent is extended or adjusted under 35 U.S.C. 154(b) by 1249 days.

(21) Appl. No.: 13/262,735

(22) PCT Filed: Mar. 29, 2010

(86) PCT No.: PCT/EP2010/054123
§ 371 (c)(1),
(2), (4) Date: Oct. 3, 2011

(87) PCT Pub. No.: WO2010/112466
PCT Pub. Date: Oct. 7, 2010

(65) Prior Publication Data
US 2012/0040262 A1    Feb. 16, 2012

(30) Foreign Application Priority Data
Apr. 1, 2009 (EP) ..................... 09157056

(51) Int. Cl.
H01M 8/10    (2016.01)
H01M 8/18    (2006.01)
H01M 10/39   (2006.01)
H01M 8/1009  (2016.01)

(52) U.S. Cl.
CPC ......... *H01M 8/184* (2013.01); *H01M 8/1009* (2013.01); *H01M 10/3909* (2013.01); *Y02E 60/528* (2013.01)

(58) Field of Classification Search
CPC .............................. H01M 10/3909–10/3981
See application file for complete search history.

(56) References Cited

U.S. PATENT DOCUMENTS 3,533,848 A * 10/1970 Winn ............................ 429/434
3,994,745 A * 11/1976 Ludwig ......................... 429/81
4,038,465 A    7/1977 Ludwig et al.
(Continued)

FOREIGN PATENT DOCUMENTS

DE    1771148 A1    2/1972
DE    2610222 A1   10/1976
(Continued)

OTHER PUBLICATIONS

International Search Report for PCT/EP2010/054123, dated Jun. 29, 2010.
(Continued)

*Primary Examiner* — Maria J Laios
*Assistant Examiner* — Angela Martin
(74) *Attorney, Agent, or Firm* — Drinker Biddle & Reath LLP

(57) ABSTRACT

The invention relates to a method of storing, transporting and supplying electrochemical energy, with storage and supply being physically separated.

15 Claims, 2 Drawing Sheets

(56) References Cited

U.S. PATENT DOCUMENTS

| | | | |
|---|---|---|---|
| 4,041,216 A | | 8/1977 | Desplanches et al. |
| 4,049,885 A | | 9/1977 | Mitoff |
| 4,536,398 A | | 8/1985 | Ito et al. |
| 4,578,325 A | * | 3/1986 | Gotou et al. .................... 429/91 |
| 4,895,776 A | * | 1/1990 | Virkar et al. ................. 429/102 |
| 5,538,808 A | * | 7/1996 | Ohshima et al. ............. 429/104 |
| 2007/0054170 A1 | * | 3/2007 | Isenberg ........................ 429/33 |

FOREIGN PATENT DOCUMENTS

| | | |
|---|---|---|
| DE | 2635900 A1 | 5/1977 |
| DE | 2927868 A1 | 1/1980 |
| EP | 116690 A1 | 8/1984 |
| GB | 2030349 A | 4/1980 |
| JP | 59-151777 A | 8/1984 |
| JP | 61-056291 A | 3/1986 |
| JP | 07-161380 | 6/1995 |
| JP | 11-185802 | 7/1999 |
| JP | 2001 118598 A | 4/2001 |
| JP | 2002 084456 A | 3/2002 |
| JP | 2003-221913 | 8/2003 |

OTHER PUBLICATIONS

International Preliminary Report on Patentability for International Applicaton PCT/EP2010/054123, dated Jun. 1, 2011.

\* cited by examiner

METHOD FOR STORING AND TRANSPORTING ELECTROCHEMICAL ENERGY

CROSS-REFERENCE TO RELATED APPLICATIONS

This application is a national stage application (under 35 U.S.C. § 371) of PCT/EP2010/054123, filed Mar. 29, 2010, which claims benefit of EP 09157056.4, filed Apr. 1, 2009

BACKGROUND OF THE INVENTION

The invention relates to a method of storing and transporting electrochemical energy using an electrochemical power station based on alkali metal, in particular sodium, and sulfur, in which the two reactants of the electrochemical reaction flow from stock containers into an electrochemical reactor and the products are discharged after the electrochemical reaction.

The generation of electrochemical energy is, in the case of fossil fuel power stations, associated with the production of $CO_2$ and therefore has a considerable influence on the greenhouse effect. Generation of energy on the basis of renewable energy carriers, e.g. wind, solar, geothermal or hydroelectric, avoids this disadvantage. However, these renewable energy carriers are at present not available at any time to match the required load. In addition, the place of energy generation may differ from the site where the energy is required. To compensate this disadvantage inherent in the system, storage, buffering and, if appropriate, also transport of the energy generated is necessary.

The energy from renewable sources such as wind turbines, solar plants is not obtained continuously. Demand and availability are not matched. A power grid which is based exclusively on renewable energy sources and is nevertheless stable cannot exist under these boundary conditions. There is a need to equalize and buffer these fluctuations with high efficiency by means of inexpensive and energy-efficient systems.

In many sparsely populated regions of the earth, e.g. the Sahara, Iceland or offshore, there is the potential to generate electric power extremely efficiently from wind, sun or geothermal energy via wind turbines, solar plants or geothermal power stations owing to the geographic, climatic and geological boundary conditions. However, there is today a lack of industrial methods of transporting this energy to regions having a high consumption. Traditional transport systems are limited by grid losses and costs of grid construction. Hydrogen technology, in which electric energy generated on site is converted into hydrogen and subsequently converted into electric power in a fuel cell has an overall efficiency of about 20% and is thus unattractive since transport and liquefaction of the hydrogen consume a large proportion of the energy.

The storage of large quantities of electric energy is, like the transport of electric energy over large distances, a problem which has been solved only unsatisfactorily up to the present. Pump storage power stations in which the potential energy of the geodatic height difference of water is utilized for conversion into electric power are at present used for storing electric energy on an industrial scale. However, the construction of such pump storage power stations is limited by geographical and ecological boundary conditions. Pressure storage power stations in which the compression of air is used for energy storage are limited because of their comparatively low efficiency. Other forms of energy storage such as supercapacitors or flywheels also address other target markets (short-term storage). Batteries, for which various concepts have been realized industrially, come closest to this requirement.

DE-A-2635900 discloses a battery which comprises at least one molten alkali metal as anode and a cathodic reaction participant which is capable of a reversible electrochemical reaction with the anodic reaction participant. The cathodic reaction participant comprises molten polysulfide salts or a two-phase mixture of molten sulfur and polysulfide salts saturated with molten sulfur. Furthermore, this battery has cation-permeable barrier layers for liquid transport between the anodic reaction zone and the cathodic reaction zone.

DE-A-2610222 discloses a battery comprising a plurality of sulfur-sodium cells, in which each cell has a cathodic compartment comprising a cathodic reactant which is liquid at operating temperature and is composed of sulfur, phosphorus or selenium or alkaline salts of these elements, at least one solid electrolyte tube comprising an anodic reactant which is liquid at the operating temperature and is composed of an alkali metal, in particular sodium, and also an anodic vessel which comprises a reserve of the anodic reactant.

Connecting a plurality of sodium-sulfur batteries as module for an energy storage system is known from EP-A-116690.

It is common to all these batteries that, as closed systems, their energy is limited by the amount of reactants (redox partners) comprised in the battery. This limitation was overcome by the flow battery. The basis of this battery concept is formed by liquid electrolytes comprising solvent and metal salt. The limited reservoir volume of the classical battery is increased by second stock containers comprising the reactants.

DE-A-2927868 discloses a flow battery for the storage and liberation of electric energy in an electrochemical cell having an anode compartment and a cathode compartment which are separated from one another by a semipermeable ion-exchange membrane, with the anode compartment being supplied with an anolyte solution, an oxidizable compound which essentially remains dissolved in the anolyte solution and can be reduced again from its oxidized form, the oxidized anolyte solution is removed from the anolyte compartment and the oxidized anolyte solution stored. At the same time, the catholyte compartment is supplied with a catholyte solution, a reducible compound which essentially remains dissolved in the catholyte solvent and can be reoxidized from its reduced form. The anolyte solution and the catholyte solution can be stored in two corresponding vessels and be circulated through the anode and cathode compartments by means of circulating pumps. The catholyte solution can, for example, comprise hexavalent bromine and the anolyte solution can comprise divalent bromine.

DE-A-1771148 and U.S. Pat. No. 3,533,848 disclose a system for obtaining electric energy by means of electrochemical combination of sodium and sulfur, which comprises a diaphragm through which sodium ions can pass having adjacent spaces for sodium and sulfur, a container for storing the sodium outside the cell, lines for conveying the sodium from the storage container to the fuel cell, a container for storing the sulfur outside the cells and lines for conveying the sulfur from the storage container to the cell. These cells can, for example, be electrically connected in series.

JP 2001/118598 discloses operating sodium-sulfur batteries using two or more tanks for molten sodium.

JP-A-200284456 discloses operating a sodium-sulfur battery using an external storage tank for sulfur which is connected in a fixed manner to the battery.

In the case of the known sodium-sulfur batteries and their embodiments as flow battery, the introduction of the energy stored in the starting materials sodium and sulfur and discharge by reaction of sodium and sulfur to form sodium sulfide or sodium polysulfides are coupled both in time and in location.

BRIEF SUMMARY OF THE INVENTION

It was therefore an object of the invention to provide a method of operating an electrochemical power station using the starting materials alkali metal, in particular sodium, and sulfur. In one embodiment, the electrochemical power station is operated by feeding in sodium and sulfur separately. Electric power is generated and sodium polysulfide is produced as a result. The sodium polysulfide is discharged from the power station and recycled. In a subsequent electrolysis, the sodium polysulfide is reused and redissociated into sodium and sulfur with consumption of energy. The method of the invention also allows the process steps of power generation and power utilization with decomposition of sodium polysulfide to be carried out in one plant. Power generation and power utilization can be optimized in terms of energy yield and loading state. The energy utilization can take place, for example, at locations having a high availability of energy and power generation can take place in locations having a high energy demand.

DETAILED DESCRIPTION OF THE INVENTION

Figure 1:
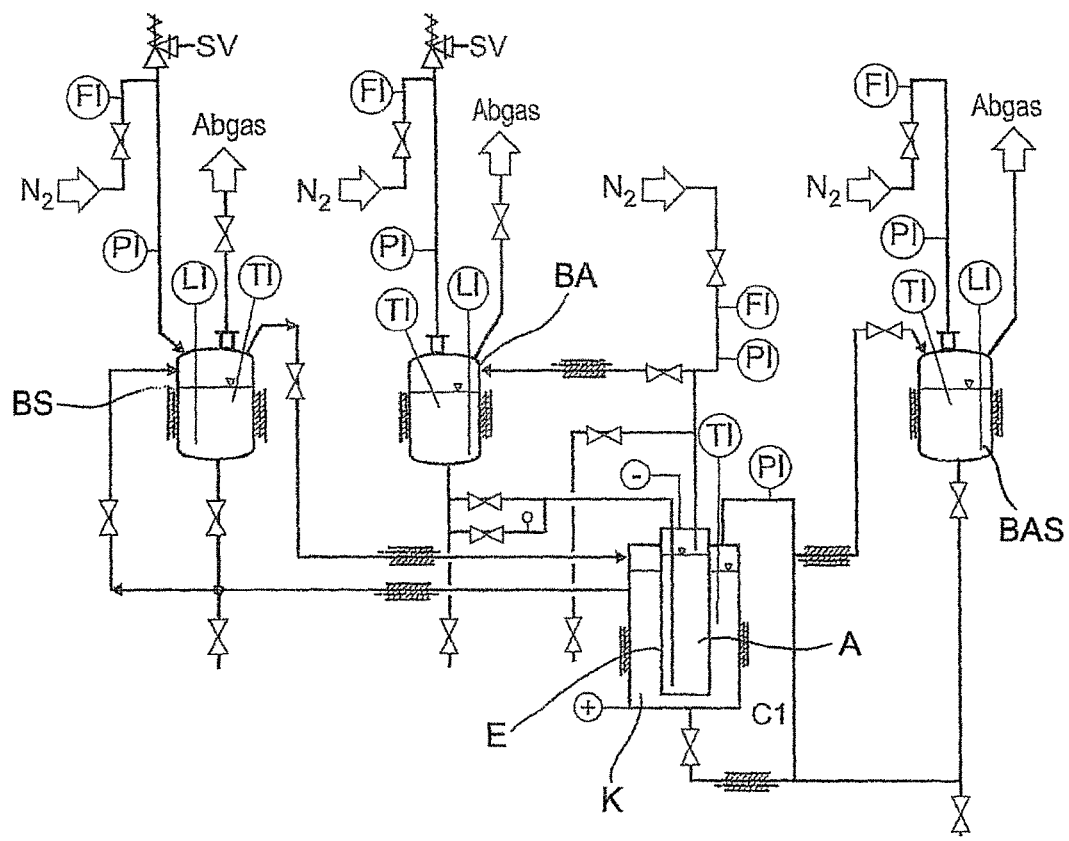
FIG. 1 is a flow diagram of the apparatus used in Example 1.

The invention relates to a method of storing, transporting and supplying electrochemical energy in an electrochemical power station, wherein, at a location where energy is required, 1.) at least one stock container BS comprising high-purity liquid sulfur and at least one stock container BA comprising liquid high-purity alkali metal are provided,
2.) at least one electrochemical alkali metal/sulfur cell is provided, with this cell comprising at least the following components:
2.1 an anode compartment A for accommodating liquid alkali metal,
2.2 a cathode compartment K for accommodating liquid sulfur, where
2.3 the compartments A and K are separated by a solid electrolyte E which at the operating temperature of the cell is permeable to cations formed by oxidation of the alkali metal,
2.4 electrodes for closing an external current circuit for the electric power generated by the reaction of the alkali metal with the sulfur,
3.) stock container BA is connected to the anode compartment A and stock container BS is connected to the cathode compartment K with introduction of liquid alkali metal into the anode compartment A and of liquid sulfur into the cathode compartment K,
4.) the external current circuit is closed, resulting in oxidation of the alkali metal, formation of alkali metal sulfides in the cathode space K and flow of electric current,
5.) alkali metal sulfides formed in the cathode space are taken off and collected in a stock container BAS,
6.) alkali metal sulfides collected in the stock container BAS are transported to a second electrochemical cell at a location having a high energy availability and are electrolyzed in the electrochemical cell to form sulfur and high-purity sodium,
7.) at least one of the components sulfur and alkali metal obtained in step 6 is transported to a location where energy is required and fed into an electrochemical power station configured as power generator.

The operating temperature of the electrochemical cell is preferably at least 250° C. and is preferably in the range from 300° C. to 350° C.

The alkali metal sulfides formed in the cathode compartment can comprise alkali metal sulfide and/or the corresponding polysulfides, in particular polysulfides of the formula $M_2S_x$, where x is a number >2, in particular sodium polysulfides $Na_2S_x$.

When power is generated in the alkali metal-sulfur reactor, alkali metal is oxidized in the anode space at the electrolyte E, with the alkali metal cations formed migrating through the semipermeable wall of the electrolyte E into the cathode space and reacting there with the sulfur to form alkali metal sulfides.

Locations where energy is required are all locations where energy is needed and is not available to a sufficient extent. Locations having a high energy availability are, in particular, locations at which electric power can be generated inexpensively and, in particular, in an environmentally friendly manner, with generation being able to be effected by means of conventional power stations but also, in particular, by means of solar energy or water and wind power.

The method of the invention therefore allows alkali metal, in particular sodium, and sulfur to be transported over long distances, for example by ship, for the purpose of generating electric power according to the method of the invention. It is thus possible to transport sodium and sulfur from a favored location for renewable energy to a consuming location which is, for example, thousands of kilometers away and for the sodium polysulfide obtained to be transported back for renewed dissociation. This allows renewable energy sources to be utilized specifically at locations where energy can be generated in excess. Conversely, the energy stored according to the principle of sodium-sulfur electrolysis can be transported to locations where there is a corresponding demand.

In a preferred embodiment, the electrochemical power station to be used according to the invention is based on reactor cells which are matched in terms of number and construction to the particular use. It is possible to use classical electrolysis cells similar to the diaphragm cell in chloralkali electrolysis. However, in the sodium-sulfur system, the solid electrolyte E, in particular a functional ceramic which conducts sodium ions, separates the liquid reactants. A plurality of single cells can be combined to form modules. To optimize the power output, a plurality of cell units separated by the electrolyte are connected in parallel. A further possible cell geometry is tubular cells in which sodium and sulfur, separated by the functional ceramic which conducts sodium ions, flow past one another. In a given volume, it is desirable to optimize the surface/volume ratio of electrolyte to reactants, regardless of the construction of the cell, so that a compact construction is possible even in large plants and the power density per volume is very high. Regardless of the construction, the individual cells, which each have a cell voltage of about 2 V, are connected in series or parallel. The voltage level set in this way is given by the sum of the voltages of the cell modules connected in series. The amount of sodium and sulfur which flows in from the stock containers, through the cells and back into the sodium polysulfide stock container BAS is matched to the power generation. Introduction and discharge of starting materials and products can occur continuously or batchwise. Alkali metal, sulfur and alkali metal polysulfide are stored in separated, heated stock containers, in particular tanks. However, mixing of sulfur and alkali metal polysulfide, i.e. a mode of operation using only two tanks, is also possible in principle. According to the invention, the capacity of the power station is not limited. Power station blocks of 1 MW, in particular 1-1000 MW, are accordingly readily possible. The voltage of the power station unit can, after conversion into alternating current, be fed into the power grid. Optimization of the electrochemical reactor seeks to achieve a very large surface area/volume ratio of the functional ceramic which conducts sodium ions to the volume of the reactants, so that a compact construction is possible even in the case of large plants and the power density per volume is very high.

In a preferred embodiment, the supply and/or discharge of electric current to the electrodes and away from the electrodes is effected via a plurality of points distributed uniformly over the surface of said electrodes. In a further preferred embodiment, the liquid alkali metal is high-purity sodium, preferably having a maximum content of divalent cations of less than 3 ppm. In a further preferred embodiment, the liquid nonmetal is sulfur. The cell is, according to a preferred method, preferably operated with the liquid alkali metal being circulated by means of an inert gas introduced under superatmospheric pressure.

In a preferred embodiment, the electrolyte comprises β-aluminum oxide or β'-aluminum oxide which has to be stabilized, preferably by means of MgO or $Li_2O$.

In a preferred embodiment, the liquid sulfur is admixed with a supporting electrolyte in the cathode compartment.

EXAMPLES

Example 1

A) Power Generation

Apparatus

The laboratory apparatus shown as a flow diagram in FIG. 1 was used.

The apparatus was maintained at 300° C. by means of electric heating tapes and appropriate thermal insulation.

The apparatus has 3 stock containers BS, BA having a utilizable volume of 2.5 liters in each case and BAS having a utilizable volume of 4 liters.

Container BS is used for the storage of the liquid sulfur, BA, for Na and BAS for the storage of sulfur and formed polysulfides from BA. C1 is the elctrolysis cell. Nitrogen may be introduced at the positions marked by $N_2$. Safety valves are at the positions marrked by SV. Measuring instruments are at the marked positions for measuring the flow rate (FI) pressure (PI), filling level (LI) and temperature (TI).

The containers have a quick-release opening in the lid for introduction of solid. The electrolysis reactor C1, which is divided by a ceramic ion-conducting solid-state electrolyte (200 $cm^2$, 2 mm thick), is connected by means of fixed piping having shutoff valves to these 3 stock containers.

All components are made of stainless steel. To avoid short circuits, the lines and apparatus parts having differing polarities are kept apart electrically by means of suitable electrical insulation.

The sulfur-conducting part of the cell and the lines and containers BS and BAS connected thereto have a positive polarity. The sodium-conducting part of the cell and the lines and the container BA connected thereto have a negative polarity.

Measurement Points:
temperature and pressure in the containers BS, BA, BAS and the electrolysis reactor C1,
fill level in the containers BS, BA, BAS,
volume flow of flushing gas in the containers BS, BA, BAS and the electrolysis reactor C1,
cell voltage and electrolysis current of electrolysis reactor C1.

Electrochemical Power Generation

Sulfur as powder and a supporting electrolyte composed of 1% of selenium and tetracyanoethylene were introduced into the container BS and melted there under inert gas.

High-purity sodium was introduced into the container BA and melted there under inert gas.

The negative electrode space of the electrolysis reactor was filled to the overflow with liquid sodium. The positive electrode space of the electrolysis reactor was filled to the overflow with liquid sulfur. When overflow occurred, the nitrogen stream flowing from BS to BAS pushed the sulfur (later polysulfide) from the reactor into the container BAS. The fill levels of the containers were then corrected by introduction of further sulfur. The containers BS and BA were filled to 80% before commencement of electrochemical power generation, while the container BAS was filled to 10%.

Before switching on the electrolysis, the bottom valve of the container BS (sulfur) was closed and the bottom valve of the container BA (sodium), which was provided with an orifice plate, was opened and the sodium valve in the bypass was closed.

An electrolysis current of from 0.1 to 40 amperes was drawn from the electrochemical reactor by switching in a variable electric resistance connected between plus pole and minus pole. The electrochemical reaction potential was determined from time to time in the absence of current with open clips.

When the electrochemical reaction potential had dropped below 2.00 volt, the bottom valve of the container BS was opened manually and liquid sulfur was fed discontinuously into the reactor C1. The sodium space of the electrolysis reactor was kept full by automatic inflow from the stock container BA.

During the course of the experiment, the fill levels in the stock containers BS and BA decreased, while the fill level in BAS increased.

During the experiment, which ran for 100 hours, 2000 g of sodium metal and 4400 g of sulfur were reacted. A total of 2330 Ah of electric charge were passed on. The average cell voltage was 1.91 volt. The analysis of the product collected in BAS corresponded to the composition $Na_2S_{2.9}$.

B) Electrolysis of Sodium Polysulfide

The electrolysis apparatus corresponds to the set-up of Example A) for power generation. 6400 g of sodium polysulfide having the composition $Na_2S_{2.9}$ were placed in the container BAS. The bottom valve of the container BS (sulfur) was closed and the bottom valve of the container BA (sodium), which was provided with an orifice plate, was opened and the sodium valve in the bypass was closed.

An electrolysis current of from 0.1 to 40 ampere, average 20 ampere, was supplied to the electrochemical reactor by switching in a regulatable electrical electrolyis power supply connected between the plus pole and minus pole. The electrochemical reaction potential was determined from time to time in the absence of electric current with open clips.

When the electrochemical reaction potential had risen above 2.07 volt, the bottom valve of the container BAS was opened manually and liquid polysulfide was fed discontinuously into the reactor C1. The sodium collected in the sodium space of the electrolysis reactor flowed back automatically into the stock container BA.

During the course of the experiment, the fill levels in the reservoirs BS and BA increased, while the fill level in BAS decreased.

During the experiment, which ran for 100 hours, 2000 g of sodium metal and 4400 g of sulfur were produced from 6400 g of polysulfide. A total of 2330 Ah of electric charge were introduced during this time. The average cell voltage was 2.25 volt.

Cycling of the Experiments

The experiments in the order electrochemical energy generation and electrochemical energy utilization by means of sodium polysulfide electrolysis were repeated 10 times without a change in the reaction behavior being observed.

Example 2

2.1 Power Station

Figure 2:
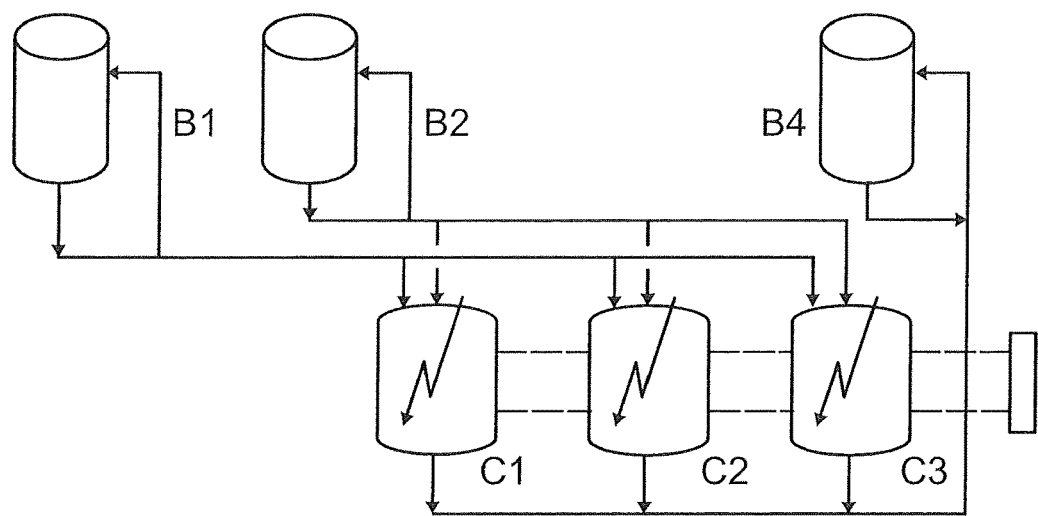
FIG. 2 is a flow diagram for Example 2.

A 1000 MW storage power station having storage capacity for 50 full load hours is designed. The flow diagram depicted in FIG. 2 schematically shows this power station.

All product-conveying apparatuses and pipes are maintained at 300° C. by means of additional electric heating and appropriate thermal insulation.

There are three stock tanks B1 and B2 having a volume of 22 000 m$^3$ each and a further tank B3 having a capacity of 45 000 m$^3$. The containers are filled with liquid sodium (B2) and liquid sulfur (B1) from tanker ships. There are, for example, 3 electrolysis reactor blocks C1, C2 and C3 having a nominal electric power of 334 MW each. These reactor blocks consist of modular ceramic reactors having ion-conducting solid-state electrolytes.

A 1000 MW storage power station has a total reactor volume of 5000 m$^3$ and a total electrode area of 500 000 m$^2$. The individual reactors are supplied with sodium and sulfur via a distributor system with separated potentials. The polysulfide formed in the reaction is collected with separated potentials and fed to the tank B3.

To avoid a short circuit, the lines and apparatus parts having different polarities are kept electrically separated by means of suitable electrical insulation.

The sulfur-conducting part of the electrolysis reactors is at a positive potential. The sodium-conducting part of the electrolysis reactors is at a negative potential.

2.2 Electrochemical Power Generation

The plant corresponding essentially to the structure described in 2.1) is used for storage by supply of power at a location having an excess of energy.

The electrochemical reaction potential is maintained at 2.00 volt per single cell by means of controlled introduction of sulfur. A total voltage on the DC side of 1000 V and a total current per reactor block of 334 kA are attained by connecting single cells electrically in series and parallel.

The direct current is converted into alternating current by means of controlled DC-AC converters. The alternating current is then brought to the grid voltage by means of the AC transformers.

Sodium Polysulfide Electrolysis

Switching-in of regulated rectifiers enables energy from the grid to be utilized in the electrolysis cells. Polysulfide is fed into the reactors and sodium and sulfur are obtained. The corresponding tanks are filled or emptied.

The absolute value of the direct currents is the same as in energy generation. The charging voltage is about 0.2 higher than the discharge voltage in energy generation.

Charging Cycles

The system is long-term-stable and stable to cycling.

$CO_2$ Avoidance Potential

Comparison of the storage power station of Example 2 with a conventional hard coal power station indicates a running time of 71 h to energy equivalence (=50 GWh) at a nominal power of 700 MW. Generation of the 50 GWh requires about 16 180 metric tons of hard coal at an efficiency of 38% and a specific coal consumption of 323 g/kWh. This corresponds to 48 540 metric tons of $CO_2$ which is saved per power generation cycle by the electrochemical storage power station, as long as the power stored is supplied exclusively from renewable energy sources.

Even the transport of reactants over distances of several thousand kilometers makes sense. In this way, sodium and sulfur can be produced at locations having a high energy availability and be transported in a targeted manner to locations having a high energy demand. For example, the reactants can be produced by means of a photovoltaic power supply in North Africa and subsequently shipped across the high seas to a seaport. At a transport distance of 3000 km and a specific oil consumption of an ocean tanker of 1.6 g of heavy oil/t of freight/km, the heavy oil consumption is 244 metric tons for an additional load of 50 000 twd. At a kinetic efficiency of the internal combustion engine of 25%, this corresponds to an energy consumption of 684 MWh. If the 50 000 twd of sodium and sulfur are assigned a conservative specific energy content of 123 Wh/kg, the total additional load corresponds to an energy content of 6241 MWh. Accordingly, only 11% of the energy originally stored in the reactants has been consumed by transport after a transport distance of 3000 km.

The invention claimed is:

1. A method of storing, transporting and supplying electrochemical energy using an electrochemical reactor with the reactants alkali metal and sulfur in an electrochemical power station, at a location where energy is required, comprising:

1.) providing at least one stock container BS comprising liquid sulfur and at least one stock container BA comprising liquid alkali metal, 2.) providing at least one electrochemical alkali metal/sulfur reactor comprising:

a negative compartment A for accommodating liquid alkali metal, a positive compartment K for accommodating liquid sulfur, wherein the compartments A and K are separated by a solid electrolyte E which at the operating temperature of the electrochemical reactor is permeable to cations formed by oxidation of the alkali metal, and electrodes for closing an external current circuit for the electric power generated by the reaction of the alkali metal with the sulfur, 3.) connecting the stock container BA to the negative compartment A and connecting the stock container BS to the positive compartment K with introduction of liquid alkali metal into the negative compartment A and of liquid sulfur into the positive compartment K, 4.) closing the external current circuit, resulting in oxidation of the alkali metal, formation of alkali metal sulfides in the positive compartment K and flow of electric current, 5.) taking off alkali metal sulfides formed in the positive compartment and collecting them in a stock container BAS, 6.) transporting the alkali metal sulfides collected in the stock container BAS to an electrochemical cell at a location having an energy availability and electrolyzing alkali metal sulfides in the electrochemical cell to form sulfur and alkalimetal, and 7.) transporting at least one of the components sulfur and alkali metal obtained in step 6 to a location where energy is required and feeding the components into an alkali metal-sulfur power station configured as a power generator;

wherein the location having a high energy availability and the location where energy is required are at physically separate locations; and wherein the stock container BA, the stock container BS, and the stock container BAS are separate heated containers.

2. The method according to claim 1, wherein the supply of electric current to the electrodes or away from the electrodes is effected via a plurality of points distributed uniformly over the surface of said electrodes.

3. The method according to claim 1, wherein the liquid alkali metal is sodium.

4. The method according to claim 1, wherein the stock container BA is electrically separated from the electrochemical reactor by means of a separation of potentials.

5. The method according to claim 1, wherein the liquid alkali metal is circulated by means of an inert gas introduced under superatmospheric pressure.

6. The method according to claim 1, wherein the positive compartment comprises liquid sulfur and liquid sodium polysulfide.

7. The method according to claim 1, wherein the electrolyte E comprises β-aluminum oxide or β"-aluminum oxide.

8. The method according to claim 7, wherein the β-aluminum oxide or β"-aluminum oxide is stabilized by means of MgO or $Li_2O$.

9. The method according to claim 1, wherein an operating temperature of at least 300° C. is maintained.

10. The method according to claim 1, wherein a supporting electrolyte is used in the positive compartment.

11. The method according to claim 1, wherein the electrochemical reactor is present as a tube reactor.

12. The method according to claim 1, wherein the liquid alkali metal is sodium having a maximum content of divalent cations of less than 3 ppm.

13. The method according to claim 1, wherein the alkali metal polysulfide formed during discharge is introduced into at least one stock container, this stock container is disconnected from the electrochemical power station used for discharge and provision of electric power and the alkali metal polysulfide is redissociated into alkali metal and sulfur by introduction of electric energy in a second cell at a physically separate location, with the second cell being able to correspond in terms of construction to the first cell.

14. The method according to claim 13, wherein the electric power required for electrolysis of the sodium polysulfide is generated at a physically separate location by means of solar, wind or hydroelectric power stations or by geothermal means.

15. The method according to claim 7, wherein the β-aluminum oxide or β"-aluminum oxide is stabilized.

* * * * *